TELEGRAPH REPEATER SYSTEM

Filed Nov. 13, 1956 3 Sheets-Sheet 1

INVENTOR.
Lawrence M. Carver
BY Edwin Leinsohn & Henry Cohen
ATTORNEYS

March 29, 1960 L. M. CARVER 2,930,849

TELEGRAPH REPEATER SYSTEM

Filed Nov. 13, 1956 3 Sheets-Sheet 2

INVENTOR.

Lawrence M. Carver

BY Edwin Leisohn & Harry Cohen

ATTORNEYS

March 29, 1960 L. M. CARVER 2,930,849

TELEGRAPH REPEATER SYSTEM

Filed Nov. 13, 1956 3 Sheets-Sheet 3

INVENTOR.
*Lawrence M. Carver*
BY *Edwin Leirsohn & Harry Cohen*
ATTORNEYS

United States Patent Office 2,930,849
Patented Mar. 29, 1960

2,930,849

TELEGRAPH REPEATER SYSTEM

Lawrence M. Carver, Springdale, Conn., assignor to Stelma, Inc., Stamford, Conn., a corporation of Connecticut Application November 13, 1956, Serial No. 621,663

9 Claims. (Cl. 178—70)

The present invention relates in general to telegraphy and in particular to a telegraph repeater system.

It is an object of the present invention to provide a telegraph repeater which does not include any electromechanical relays whatsoever. In this connection, it is a more specific object of the present invention to provide an electronic repeater in which the strain of electromechanical relay failure and the need for constant mechanical maintenance are both eliminated.

Another object is the provision of a repeater in which distortion is greatly reduced and which is capable of handling much greater keying speeds than repeaters of the prior art.

Another object is the provision of an electronic repeater in which there is no direct-current connection between the telegraph loops with which the repeater is being used so as to provide greater flexibility in use.

A further object is the provision of an electronic telegraph repeater system in which there is no direct-current connection between any loop of the repeater and ground potential so as to permit any leg of the connected loop to be grounded or floating.

A still further object is to provide an electronic telegraph repeater system in which "break-in" operation may be effected.

The above and other objects, features and advantages of the present invention will be more fully understood from the following description considered in connection with the accompanying illustrative drawings.

In the drawings, which illustrate the best mode presently contemplated of carrying out the invention:

Figures 1, 2, 3:
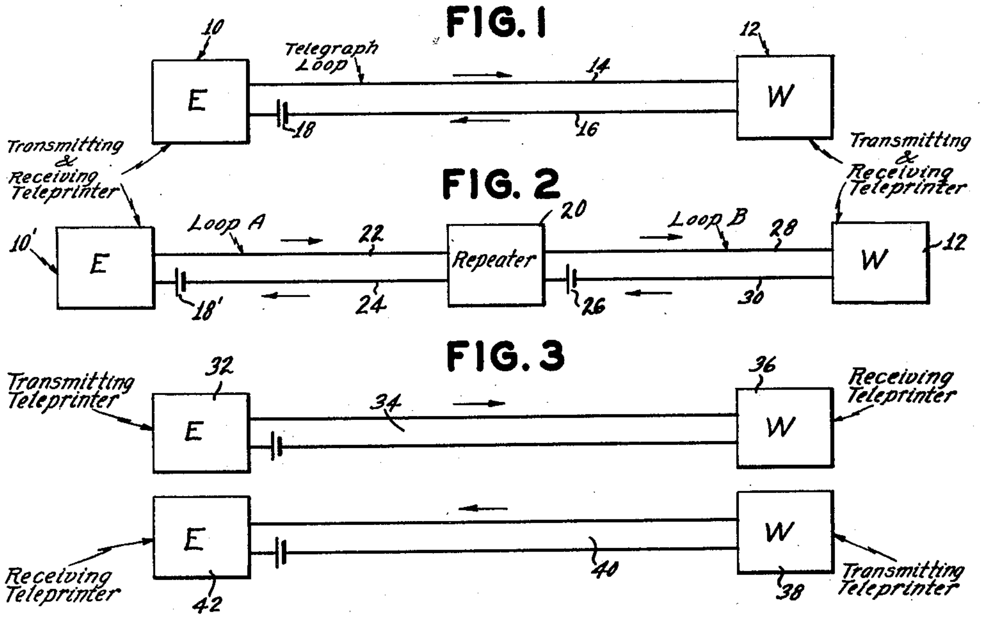
Fig. 1 illustrates a two-wire two-terminal telegraph system.
Fig. 2 illustrates a two-wire two-terminal telegraph repeater system utilizing an in-line repeater.
Fig. 3 illustrates a four-wire telegraph system.

Referring to Fig. 1, transmitting and receiving teleprinter equipment is shown at an E terminal 10 and at a W terminal 12, and connected in a telegraph loop which includes two conductive wires 14 and 16 and a battery 18. The teleprinter equipment includes loop current switching or keying contacts for transmitting telegraph signals, as well as relay coil or magnet coil loop-current responsive means for receiving the telegraph signals. The circuit shown in Fig. 1 can transmit in either direction, but cannot transmit in both directions simultaneously. When this circuit is in operation, a telegraph loop consisting of the transmitting contacts, loop battery 18, wires 14 and 16, and the receiving relay or magnet coil, provides a continuous circuit for the telegraph signals, generated by whichever teleprinter equipment is keying the loop current generated by the battery 18.

In such a system, the length of the telegraph loop is limited by the battery voltage, which is usually fixed, since a certain current (usually 20 or 60 milliamperes) is necessary to operate the conventional magnets or relays in the receiving teleprinter. Increasing the length of the loop results in an increase of the loop resistance so that, beyond a certain length, the required loop current cannot be secured. However, the length of the telegraph loop between the two stations or terminals can be doubled by using an "in-line" repeater 20, as shown in Fig. 2. In this arrangement, the original telegraph loop has been changed to become two separate telegraph loops A and B, each of which loops might be as long as a single telegraph loop as shown in Fig. 1.

In Fig. 2, transmitting and receiving teleprinter device 10 is connected to the repeater 20 by the lines 22 and 24 in the telegraph loop A in which the battery 18' is connected in series. An additional battery 26 is utilized between the repeater 20 and the transmitting and receiving teleprinter 12 to provide current in the telegraph loop B which includes the wires 28 and 30. An in-line repeater must include input means for receiving or responding to the loop current in either loop and output means for keying the loop current in the other loop during transmission in either direction. In each loop, the elements connected in series are functionally similar to those discussed with respect to Fig. 1. The repeater 20 should reproduce signals with minimum distortion in either direction.

In-line operation refers to a two-wire system in ordinary telegraph circuits wherein simultaneous transmission of messages in both directions is not desired, but transmission in both directions at different times is desired. An additional feature of some in-line repeater systems is "break-in." This term refers to a process wherein the operator at the receiving teleprinter interrupts the sending operator's service by changing the receiving station to "space," opening the loop circuit and causing the "home" copy or transmitting teleprinter to "run open." This signals the sending station to interrupt its transmission and wait for a message from the previously receiving station. The feature of providing for the break-in process in an in-line telegraph repeater is valuable because it permits flexibility of operation.

These systems are referred to as "neutral" systems. Operation of the equipment is based on uni-directional current rather than on positive and negative values of current. "Neutral" operation uses current flow for the "mark" or closed position of the transmitting contacts and no current for the "space" or open position thereof. As is well known to those skilled in the art, the receiving relay in the equipment is energized by loop current during the mark periods, while either a "bias" winding or a spring, on the same receiving relay assembly, operates the receiving relay to the spacing condition.

A four-wire system, shown in Fig. 3, allows the operator at either the E or the W station to send and to receive telegraph signals simultaneously, one pair of wires being used for traffic from the E station to the W station utilizing the transmitting teleprinter 32, telegraph loop 34, and the receiving teleprinter 36; the other pair of wires may be used for traffic from the W station transmitting teleprinter 38, through telegraph loop 40, to the receiving teleprinter 42 at the E station. A telegraph repeater made in accordance with the present invention can be utilized in such a four-wire system, as well as in a two-wire system.

Figure 4:
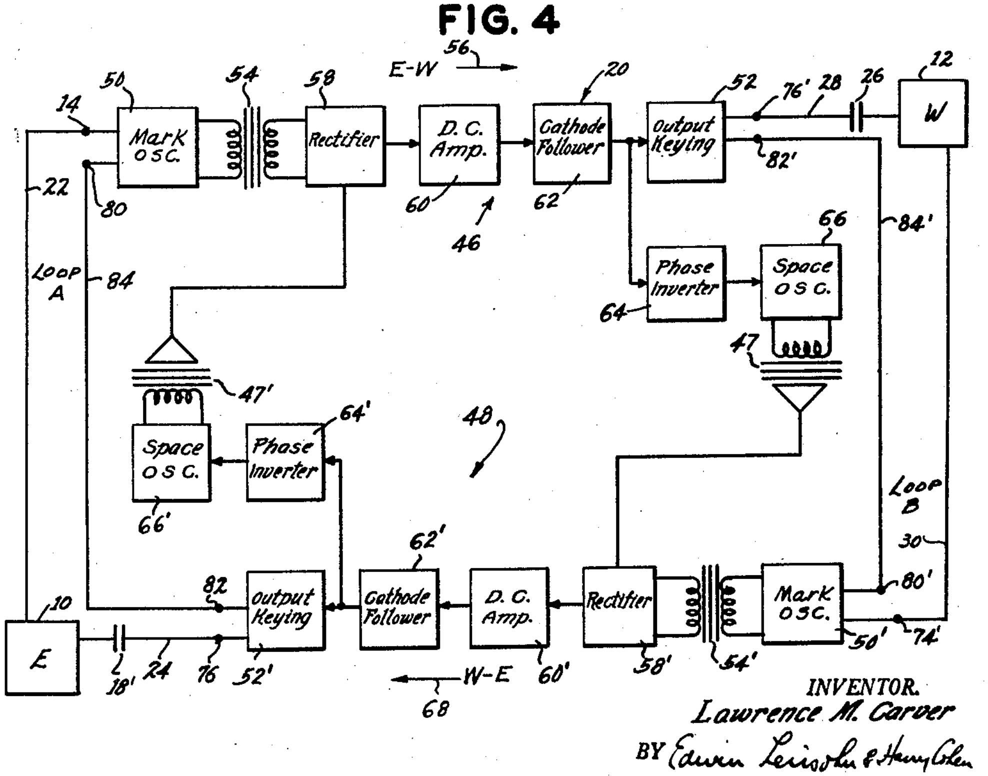
Fig. 4 is a simplified block diagram of a repeater pursuant to the present invention connected as shown in Fig. 2.

Fig. 4 is a simplified block diagram of a telegraph repeater made in accordance with the present invention, illustratively shown connected for two-wire service with the elements of telegraph loops A and B of Fig. 2. In the repeater 20, the top and bottom halves of the diagram show two identical one-way electronic repeaters or channels 46 and 48, channel 48 having corresponding stages and primed reference numerals for the stages in repeater 46. Repeater channel 46 transmits from the E station to the W station as indicated by the arrow 56, while repeater channel 48 transmits in the opposite direction as indicated by the arrow 68. Transformers 47 and 47' couple these two channels (for holding functions that will be described) and jumpers 84 and 84' connect one input terminal of each repeater to one output terminal of the other repeater channel, for two-wire in-line service. The telegraph loop wires 22 and 24 are shown connected to the input terminal 74 of repeater channel 46, and the output terminal 76 of channel 48, respectively. The wires 28 and 30 are shown connected to the output terminal 76' of repeater 46, and the input terminal 74' of repeater 48, respectively. Transmitting and receiving teleprinter stations, 10 and 12 respectively, and loop batteries 18 and 26 complete the two telegraph loops.

In the repeater 20, the mark oscillators 50 and 50' comprise telegraph signal input circuits. Output keying circuits 52 and 52', analogous in function to the transmitting contacts ordinarily used in telegraph circuits, but without the maintenance requirements of the relays therein, interrupt the current in the telegraph loop which includes the receiving teleprinter. For instance, assume the E station 10 is transmitting and the W station 12 is receiving telegraph signals. The telegraph mark current generated by the battery 18 and transmitting teleprinter 10 in loop A energize the mark oscillator 50, and the intermediate circuitry ultimately activates the output keying stage 52 to switch the loop current in loop B to regenerate the telegraph mark signals received in loop A. In order for this to happen, the electronic telegraph repeater 20 provides solutions to certain problems indicated by the objects of this invention.

These problems consist in part of maintaining loop continuity in the telegraph loop in which the transmitting teleprinter is interrupting the loop circuit, as well as in the telegraph loop B wherein the receiver teleprinter 12 is receiving telegraph signals generated by interruptions in loop current performed by the output keying stage 52. In the case of the transmitting loop (loop A, in this illustration) this means that the output keying stage 52' of the repeater channel 48 must be maintained in a conductive or closed-circuit state throughout the transmission of the telegraph message by the E teleprinter 10. The mark oscillator stage 50, also included in this transmitting loop, keeps A closed by an unvarying low impedance connected internally between terminals 74 and 80. In loop B, mark oscillator 50' also presents this input impedance between terminals 74' and 80' and output keying stage 52 keys the loop current to regenerate the telegraph signals which appear in loop A.

Another problem that is solved by the repeater 20 is that of providing break-in facility, wherein the operator at the station opens the circuit of loop B by switching his teleprinter device 12 to space which must, for the break-in function, appear as a space or continuous interruption of the current in loop A. The series connection of the input circuits of one channel with the outputs of the other channel, by jumpers 84 and 84', in combination with the transformer-coupled space oscillators 66 and 66', are utilized in accordance with this invention to perform these functions.

Referring to the upper transmission channel 46 of the repeater 20, related functions are performed in each repeater channel by the transformer coupling devices. The pulsed direct current telegraph "mark" signals received at the mark oscillator 50 from loop A are converted thereby into pulsed high audio frequency tones which are coupled by the transformer 54 to a rectifier 58. The transformer 54 thereby is utilized to couple the incoming telegraph signals, by intermediate tone conversion and subsequent demodulation, and thus to provide complete direct current isolation of input stage 50 from the output stage 52. Transformer 54' performs a similar function in the opposite channel, and transformers 47 and 47' provide D.-C. isolation of other signals utilized during in-line, two-wire operation of the repeater apparatus 20. The D.-C. isolation of all input and output circuits allows the series connection of the input stage of each channel with the output stage of the other channel.

The rectifier 58, by rectifying the tone signals generated by oscillator 50 in response to the mark signals or loop current pulses in loop A, regenerates the telegraph signals of loop A. These regenerated signals, negative direct-current voltages, are amplified in a direct-current limiting amplifier 60 which controls the bias applied to a cathode follower 62. The positive output from the cathode follower 62 is applied to an output keying circuit 52 which thus responds to the input mark pulses by closing the telegraph loop B with a low impedance path, and responds to the space input pulses generated in loop A by opening the loop B or presenting a high impedance across terminals 76' and 82'. The circuit thus described including stages 50, 54, 58, 60, 62 and 52, are sufficient to perform one-way telegraph repeating operations for such use as is disclosed in the discussion accompanying Figure 3. Connected as shown in Figure 4, the two channels 46 and 48 of the repeater apparatus hold the output keying stage 52' of channel 48 in a conductive state, throughout normal transmission from the teleprinter 10, as discussed below.

During the transmission of a mark signal from the teleprinter 10, the repeated mark signal in loop B appears across the terminals 74' and 80' of mark oscillator 50' and serves to keep the output keying stage 52' of channel 48 in a conductive state in the manner described with reference to the channel 46 above. During the space or no-current state of loop A, during transmission from the teleprinter 10, a space oscillator 66, driven by phase inverter 64 and cathode follower 62, applies tone signals to the rectifier 58' of channel 48 during those times that a space appears in channel 46. Thus, while the loop A current and loop B current are cut off during the transmission of a space, the rectifier 58' and the following circuits in channel 48 respond to maintain the output keying stage 52' in a conductive state. This is necessary so that when the teleprinter 10 again closes the circuit of loop A, the circuit is otherwise continuous and mark oscillator 50 can respond to the loop A current or mark condition.

During such service, the operator at the W station may break-in or switch his receiving teleprinter 12 to space, which opens the circuit of loop B and thus prevents a mark or conductive condition of output keying stage 52 of channel 46 from causing the mark oscillator 50' of channel 48 to respond and cause the output keying stage 52' to conduct. At this time, if or when the transmitting teleprinter 10 transmits a mark and turns off space oscillator 66, space oscillator 66' of the lower channel 48 becomes energized, since a space input condition exists in that channel, and causes a continuous mark condition in the upper channel 46. This mark condition causes output keying stage 52 to be conductive, but does not affect the input mark oscillator 50' of the lower channel. Since the output keying stage 52' is now always non-conductive, the open-circuit condition of loop B has been repeated in loop A, and the transmitting teleprinter 10 "runs open." When the E station then prepares to receive a message and the W station transmits, the above discussed sequence of operations is reversed as to channel and direction. For instance, if the operator at the East station has prepared his teleprinter to receive messages, in response to his equipment running open, it is then necessary that the B loop be closed entirely except for the transmitting contacts of the teleprinter 12, or that output keying stage 52 will be in a continuous conductive state. This is assured by space oscillator 66', driven by phase inverter 64' and the cathode follower 62'. Since this oscillator operates only during a space condition, which exists in channel 48 during break-in on the part of W station, the rectifier 58 rectifies the continuous tone coupled by transformer 47' and maintains the output keying stage 52 in a conductive state. The W station may then commence transmitting to the E station, and the output keying stage 52 is maintained in a conductive state during the transmission of mark pulses by the fact that the output keying stage 52' of lower channel 48 is connected in series with the input stage or mark oscillator 50 of upper channel 46.

Figure 5:
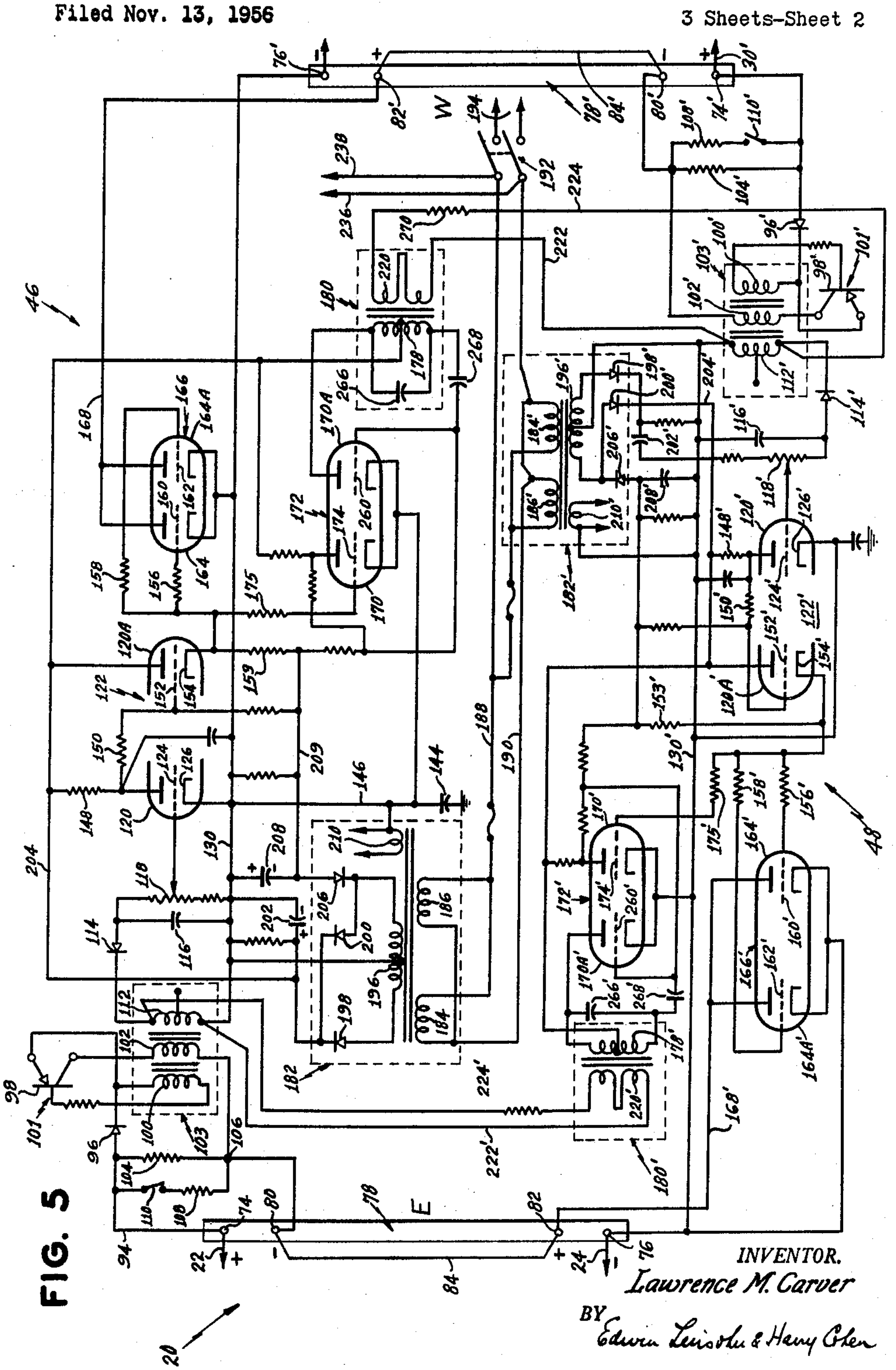
Fig. 5 is a schematic diagram of the repeater illustrated in Fig. 4.
Figure 6:
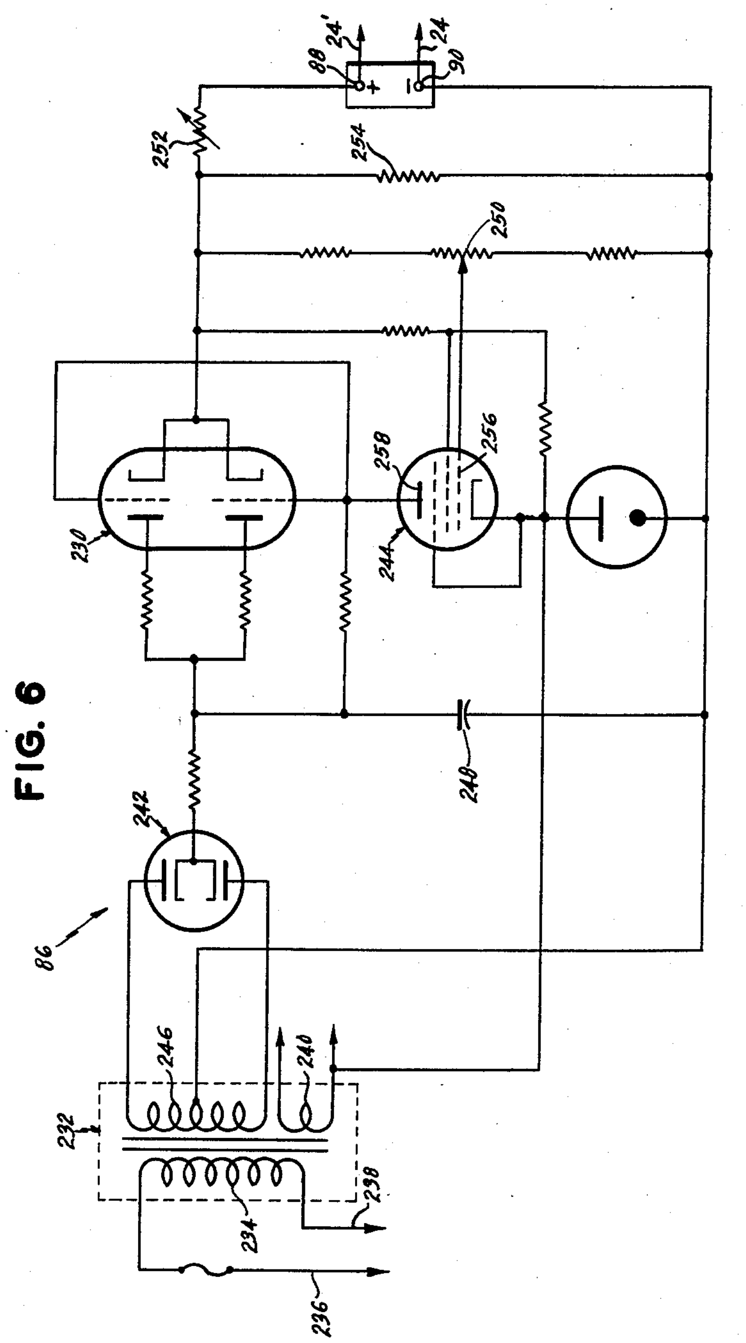
Fig. 6 is a schematic diagram of a power supply utilized with the repeater of Fig. 5.

Referring now to Figs. 5 and 6 in detail, there is illustrated a schematic diagram of the repeater apparatus 20 of the present invention, constituted essentially by the one-way electronic repeaters 46 and 48 which are connected with the input of one in series with the output of the other for in-line one-way reversible operation. Since the repeater circuit 46 is identical with the repeater circuit 48, and since the corresponding components of repeater section 48 are given the same reference primed numerals as in the repeater section 46, a description of the circuit of repeater section 46 will suffice to also describe the repeater section 48.

The wires 22 and 24 of telegraph loop A extend from the terminals 74 and 76 of a terminal strip 78 which also includes the terminals 80 and 82. In a two-wire in-line operation, the terminals 80 and 82 are interconnected by a jumper 84. The loop battery 18' or 26 may be replaced by the loop power supply 86 illustrated in Fig. 6, having the positive output terminal 88 and the negative output terminal 90. With battery 18' replaced with power supply 86, the wire 24 extends from output terminal 76 of repeater 48 to the negative supply terminal 90 and the wire 24' extends from the positive supply terminal 88 to one side of station 10, as illustrated in Fig. 2, the other side of said station being connected by the line 22 to the input terminal 74 of the repeater 46. The terminal 74 is connected by the lead 94 to a crystal rectifier 96 at the input to a high audio-frequency mark oscillator 101 which includes the junction type transistor 98 and the primary windings 100 and 102 of the direct-current isolation transformer 103. The rectifier 96 protects the oscillator transistor 98 in case incorrect polarity is connected across input terminals 74 and 80. An input resistor 104 is connected across the terminals 74 and 80, one end thereof being connected to the lead 94 and the other end thereof being connected to a lead 106 which extends from the transformer winding 102. A shunt resistor 108 is connected in parallel with the input resistor 104 via the normally open switch 110 which is closed for 60 milliampere loop currents and kept open for 20 milliampere loop currents. This assures that the same voltage will be applied to the transistor oscillator for either 20 or 60 milliampere inputs.

During transmission from the E station to the W station, current flows in loop A during a mark signal. The signal path is as follows. The current passes from E station through input terminal 74 of repeater 46 to one side of resistor 104. The other side of resistor 104 is connected to terminal 80, jumper 84 and terminal 82, to the plate of keying tube 166'. The cathode of the keying tube 166' is connected to output terminal 76 of repeater 48. The loop A current path continues from terminal 76 on wire 24 to the negative terminal of loop battery 18' (Fig. 4) and from the positive terminal of loop battery 18' back to E station 10. In the loop A current path just described there are two elements which may independently control the passage of current. The first such control is the E station. If the loop A current path is otherwise complete current will flow when E station goes to mark. The second current determining factor is keying tube 166' in repeater 48. In response to a mark signal in repeater 48, produced by a mark or a space signal in repeater 46, keying tube 166' is biased for conduction and if E station goes to mark current will flow in loop A. On the other hand, in the absence of a mark signal in repeater 48, keying tube 166' is biased to cut off. Since keying tube 166' is in series with the E station in the loop A current path no current can flow in loop A when the keying tube 166' is biased to cut-off. Current in loop A produces a voltage drop across resistor 104 which is applied to the mark oscillator 101 which utilizes the primary windings of transformer 103 in a feed back circuit to produce a high audio-frequency oscillation. The tone signal produced by the mark oscillator 101 is transmitted by the transformer 103, which provides direct-current isolation between the A loop and the circuits which connect the B loop to the secondary winding 112 of the transformer 103, as hereinafter described. A crystal rectifier 114 and a capacitor 116 are connected across the secondary winding 112, the rectifier 114 rectifying the output of the transformer 103 to provide a direct-current mark voltage and the capacitor 116 serving to filter alternating-current variations in the output of the rectifier. The direct-current voltage developed at the output of the rectifier 114 appears across a potentiometer 118 connected in parallel with the filter capacitor 116.

The input section 120 of a dual triode 122 has its control grid 124 connected to the potentiometer 118. The cathode 126 of tube section 120 is connected to a common lead 130 which extends from the secondary winding 112 of the transformer 103 to the terminal 76' of a terminal strip 78'.

Said lead 130 is not grounded but is connected to a filter condenser 144 through the line 146, said filter condenser being grounded. The output developed across the plate load resistor 148 of the tube section 120 is applied through a grid voltage divider 150 to the control grid 152 of the tube section 120A of tube 122. Tube section 120A functions as a cathode follower.

The cathode 154 of the cathode follower 120A is connected through the grid resistors 156 and 158 to the control grids 160 and 162, respectively, of the companion tube sections 164 and 164A, respectively, of the dual triode 166, which functions as the output keying tube for the repeater 46. The cathodes of said sections are connected to the common lead 130, which floats relative to ground. Output from the plates of the keying tube 166 is applied through the lead 168 to the terminal 82' of terminal strip 78'.

In addition to the previously described keying circuits, the repeater 46 is also provided with holding circuits which utilize the tube sections 170 and 170A of the dual triode 172, the former serving as a phase inverter and the latter as a space oscillator. The control grid 174 of tube section 170 is connected through the grid resistor 175 to the cathode 154 of the cathode follower 120A. The cathodes of the tube 172 also float relative to ground, being connected to capacitor 144. The plate of tube section 170A is connected to one end of the primary winding 178 of the transformer 180 which functions as an electronic coupling means from repeater 46 to repeater 48.

The repeater apparatus 20 is provided with a separate power supply for each of its channels, which also allows isolation of the circuits. Provision is made for a power transformer 182 which supplies filament, positive, and negative voltages for tubes 122, 166 and 172. The primary windings 184 and 186 of the power transformer 182 are connected via the leads 188 and 190 on the On-Off switch 192 to a suitable alternating-current source, indicated at 194. The secondary winding 196 of the power transformer 182 is connected to the rectifiers 198 and 200, which provide a positive direct-current voltage, filtered by the filter capacitor 202, and used for the plate voltage supply for tubes 122 and 172. In this connection, it will be noted that the plate supply line 204 extends from the junction of rectifiers 198 and 200 with filter capacitor 202 to the plates of said tubes. The rectifier 206 is connected to the secondary 196 to provide a negative voltage which is filtered by the filter capacitor 208, to provide negative biasing potential for the tubes through the lead 209. The secondary winding 210 provides the filament voltages for said tubes.

Each of the previously described components for the repeater 46 is duplicated by a component in the repeater 48 which bears the similar primed reference numeral. It will be noted that the secondary winding 220 of the output transformer 180 of the repeater 46 is connected, via the leads 222 and 224, in parallel with the secondary winding 112′ of the input transformer 103′ of the repeater 48. Similarly, the secondary 220′ of the output transformer 180′ of the repeater 48 is connected, via the leads 222′ and 224′, in parallel with the secondary winding 112 of the input transformer 103 of the repeater 46. As previously indicated, the plates of the output keying tube 166 of the repeater 46 are connected via the lead 168 to the terminal 82′ of the terminal strip 78′ and the cathodes of said tube are connected via the common lead 130 to the terminal 76′ of the terminal strip 78′. Similarly, the plates of the keying tube 166′ in the repeater 48 are connected by the lead 168′ to the terminal 82 of the terminal strip 78 and the cathodes of said tube are connected to the terminal 76 of said strip and to the common line 130′. The separate transformer power supply 182 and its associated components for the repeater 46 are duplicated in the power transformer 182′ and its associated components for the repeater 48.

The previously mentioned loop power supply is illustrated in Fig. 6. Said power supply uses a conventional series type of regulator circuit utilizing the series regulator tube 230. A transformer 232 has its primary winding 234 connected via the leads 236 and 238 to the previously mentioned On-Off switch 192. The transformer 232 furnishes filament power through its secondary winding 240 for the tubes 230, 242 and 244, and through its secondary winding 246 furnishes a high voltage 60 milliampere current for the rectifier stage 242. The capacitor 248 provides filtering along with the filtering action of the series regulator circuit to keep the output ripple to a minimum. The potentiometer 250 sets the bias voltage for the tube 244 to provide the desired output voltage at the output terminals 88 and 90. The variable resistor 252 provides a series loop current adjustment when the supply is connected into a telegraph loop. This system regulates in the following manner: When the output voltage which appears across resistor 254 tends to drop, the control grid 256 of tube 244 goes negative. This makes the plate 258 of said tube 244 swing the control grids of tube 230 more positive. This reduces the effective resistance of tube 230 to increase the voltage across the resistor 254.

Loop B, as previously indicated includes the lead 28, which is connected between terminal 76′ and one side of station W, and lead 30′ which extends from terminal 74′ to one side of battery 26, the other side of which is connected by lead 30 to the other side of station W. Consequently, it will be noted that, due to the jumper 84′ between the terminals 82′ and 80′, output keying tube 166 of channel 46 is in series with input resistor 104′ of channel 48 in loop B. Similarly, output keying tube 166′ of channel 48 is in series with input resistor 104 of channel 46 in loop A.

The repeater apparatus 20 operates as follows:

Assuming now that a mark signal is transmitted from station E to station W, the current in the loop A produces a voltage drop across the resistor 104 which is applied to the mark oscillator 101 to produce a high audio-frequency oscillation. The secondary of the transformer 103 applies the tone signal of the oscillator 101 to the crystal rectifier 114 where the signal is rectified and filtered and again becomes pure direct-current voltage which is applied to the grid 124 of the direct-current limiting amplifier 120, to cut off the latter. With the tube 120 cut off, its plate potential goes highly positive, and since the grid 152 of the cathode follower 120A is connected to the plate of tube 120 by the resistor 150, the grid 152 also goes positive and the resultant current flow across cathode resistor 153 makes the cathode 154 go positive to apply a positive potential to the grids 160 and 162 of the output keying tube 166, via the grid current limiting resistors 156 and 158, respectively. Tube 166 is a dual triode which is connected in parallel for lowest output impedance. Consequently, tube 166 conducts heavily, appearing as a low resistance from plate to cathode in the loop B. This produces a mark condition in the loop B.

The positive potential across the cathode of the cathode follower 120A also is applied to the control grid 174 of the phase inverter 170 via the resistor 175. This causes the phase inverter to conduct making its plate more negative and said negative output is coupled into grid 260 of the space oscillator tube 170A so as to cut that tube off and no output is coupled through the leads 222 and 224 into channel 48. However the loop B current turned on by output keying stage 166 and applied to input resistor 104′ of channel 48 biases keying tube 166′ for conduction in the same manner that a mark signal at input resistor 104 biases keying tube 166 for conduction.

On mark, loop A is unbroken and keying tube 166 is able to conduct. On space input to the A loop, the mark oscillator 101 does not oscillate because loop A is broken at E station and there is no voltage drop in resistor 104 to activate oscillator 101. The direct-current amplifier tube 120 loses bias and conduction of said amplifier tube reduces the positive potential at the plate thereof. This causes the grid voltage at the grid 152 of the cathode follower 122 to go negative reducing current flow through cathode resistor 153 and causing the cathode 154 to go negative. This biases the grids 160 and 162 of the keying tube 166 to cut off and produces a space condition in loop B. The switching action from mark-to-space or from space-to-mark is very fast in the circuit. The holding circuits comprising the phase inverter 170 and the space oscillator tube 170A hold the keying tube 166′ in a conductive state during the space signal from the A loop. The grid 174 of the phase inverter 170 is then made negative through the connection of resistor 175 to the cathode 154 of the cathode follower. This reduces plate current flow in tube section 170 and its plate goes positive bringing the grid voltage of the space oscillator tube 170A from negative to a more positive point where the tube 170A oscillates in a Hartley circuit using the primary 178 of the transformer 180 as the tank inductor. A capacitor 266 connected across the primary 178 of the transformer 180 is used to tune the circuit, with the capacitor 268 serving as a grid capacitor. Output from the secondary 220 of the transformer 180 is applied through an amplitude adjusting resistor 270 across the secondary of the transformer 103′ where the signal is fed directly to the rectifier 114′ and rectified to a negative voltage. This biases the direct-current amplifier tube 120′ to cause conduction of the output keying tube 166′ in the same manner as a marking signal in the B loop would do. The action of the repeater circuit 48 between transformer 103′ and the keying tube 166′ is the same as that between transformer 103 and keying tube 166. Consequently, keying tube 166′ is biased for conduction in readiness for the marking signal to return to the A loop. Although keying tube 166′ is biased for conduction, no conduction from the plate to the cathode of keying tube 166′ takes place since E station is on space and the loop A current path is broken at that point. It it recalled that the loop A current path flowing in resistor 104 activates mark oscillator 101 to generate a mark signal in repeater 46. Therefore, in the absence of current in loop A, the mark signal coupled in repeater 48 by space oscillator 170A cannot activate mark oscillator 101 in repeater 46. Repeater 46 therefore remains in a space condition until E station goes to mark again. If the keying tube 166' were not held in a conductive state during spacing condition, the A loop would be locked out and could not return to mark.

Tone coupling from the space oscillator tube 170A and 170A' to the input of the rectifiers 114' and 114, respectively, using the transformers 180 and 180' again permits direct-current isolation between the keying circuits of the A and B loops.

"Break-in" action is secured as follows: Assuming now the E station is transmitting to the W station, W breaks in by opening loop B to a space condition. This stops the mark oscillator 101' and removes signal from rectifier 114' through transformer 103'. A space condition now exists in the repeater section 48 with the keying tube 166' not conducting, and with the space oscillator tube 170A' providing signal to the repeater section 46 which keeps the space oscillator tube 170A unexcited. The conditions existing in repeater 46 and 48 remain unchanged when E station goes to space during "break-in." Space oscillator 170A' continues to couple a mark signal into repeater 46 and as a consequence of this action repeater 48 remains in the space condition just described. During "break-in," therefore repeater 46 is in a continuous mark condition and repeater 48 is in a continuous space condition. Keying tube 166' is thereby maintained continuously cut-off and no current flows in loop A. A permanent space is now produced in the A loop causing the E station "home copy" teleprinter to act as a signal that W station wants to transmit an urgent message. E station now switches to receive and when W station closes its loop B to transmit, W station knows E station is prepared to receive by observing a steady mark in loop B. If traffic is still received at W station, W station knows that E station did not get its signal and W station must open its line again to signal E station.

While I have shown and described the preferred embodiments of my invention, it will be understood that various changes may be made in the idea or principles of the invention within the scope of the appended claims.

Having thus described my invention, what I claim and desire to secure by Letters Patent, is:

1. Telegraph repeater apparatus, comprising a first signal transmission channel for transmission in a first direction and a second signal transmission channel for transmission in the opposite direction, each channel having an input circuit, a normally de-energized oscillator rendered operable in response to receipt of a mark signal at said input circuit and rendered inoperative in response to receipt of a space signal at said input circuit, a direct current limiting amplifier operable to cut-off in response to the operation of said oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit.

2. Telegraph repeater apparatus, comprising a first signal transmission channel for transmission in a first direction and a second signal transmission channel for transmission in the opposite direction, each channel having an input circuit, a normally de-energized oscillator rendered operable in response to receipt of a mark signal at said input circuit and rendered inoperative in response to receipt of a space signal at said input circuit, a direct current limiting amplifier operable to cut-off in response to the operation of said oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit, the output keying stage of each channel being in series circuit with the input circuit of the other channel whereby the output keying stage of a non-transmitting channel is rendered conductive when a mark signal is received by the transmitting channel.

3. Telegraph repeater apparatus, comprising a first signal transmission channel for transmission in a first direction and a second signal transmission channel for transmission in the opposite direction, each channel having an input circuit, a normally de-energized oscillator rendered operable in response to receipt of a mark signal at said input circuit and rendered inoperative in response to receipt of a space signal at said input circuit, a direct current limiting amplifier operable to cut-off in response to the operation of said oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit, the output keying stage of each channel being in series circuit with the input circuit of the other channel whereby the output keying stage of a non-transmitting channel is rendered conductive when a mark signal is received by the transmitting channel, and holding circuit means interconnecting said channels and operable to hold the output keying stage of the non-transmitting channel in mark condition upon receipt of a space signal in the transmitting channel.

4. Telegraph repeater apparatus, comprising a first signal transmission channel for transmission in a first direction and a second signal transmission channel for transmission in the opposite direction, each channel having an input circuit, a normally de-energized oscillator rendered operable in response to receipt of a mark signal at said input circuit and rendered inoperative in response to receipt of a space signal at said input circuit, a direct current limiting amplifier operable to cut-off in response to the operation of said oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit, the output keying stage of each channel being in series circuit with the input circuit of the other channel whereby the output keying stage of a non-transmitting channel is rendered conductive when a mark signal is received by the transmitting channel, and holding circuit means interconnecting said channels and operable to hold the output keying stage of the non-transmitting channel in mark condition upon receipt of a space signal in the transmitting channel, said holding circuit means comprising an oscillator in each channel, means retaining said oscillator in inoperative condition upon the receipt of a mark signal at its associated channel, means rendering said latter oscillator operative upon the receipt of a space signal at its associated channel, and means for coupling the output of said latter oscillator into the other channel.

5. A telegraph repeater system, comprising means defining a first direct-current telegraph loop, means defining a second direct-current telegraph loop, and two-way, inline electronic telegraph repeater means in circuit between said loops, said repeater means consisting entirely of parts which are motionless during operation thereof, said repeater means including an output keying circuit in each of said loops operable in response to a telegraph signal input from the other of said loops, means to retain each keying circuit in a continuous conductive state during telegraph signal input from the loop in which it is included and external reception of the repeated telegraph signal from the other loop, and means to retain each keying circuit in a continuous cut-off state during a combination of a break-in space input from the loop in which it is not included and a mark input from the loop in which it is included.

6. A two-way, in-line, telegraph repeater, comprising parts which are entirely motionless during normal operation thereof, said repeater having first and second repeater channels adapted for interconnection between a pair of telegraph loops for simultaneous signal transmission in opposite directions, respectively, each channel having an input circiut and a normally de-energized output keying circuit, said repeater also including direct-current coupling means to energize the output keying circuits in both channels in response to a mark signal received by the input circuit of one of said channels during normal operation, and alternating-current means coupling said channels to retain in energized condition the output keying circuit of the other of said channels upon the receipt of a space signal at the input circuit of said one of said channels during normal operation, said direct-current coupling means and said alternating-current coupling means having provision so that a continuous break-in space signal at the input circuit of said other of said channels will cause said output keying circuit of said other of said channels to be de-energized as soon as the next mark signal is received at the input circuit of said one of said channels.

7. Two-way, in-line, telegraph repeater means which provides for normal and break-in operation, comprising parts which are entirely motionless during operation thereof, said repeater apparatus having a first signal transmission channel for transmission in a first direction and a second signal transmission channel for transmission in the opposite direction, each channel having an input circuit, a normally de-energized oscillator rendered operable in response to receipt of a mark signal at said input circuit and rendered inoperative in response to receipt of a space signal at said input circuit, a direct current limiting amplifier operable to cut-off in response to the operation of said oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit, the output keying stage of each channel being in series circuit with the input circuit of the other channel whereby the output keying stage of a non-transmitting channel is rendered conductive when a mark signal is received by the transmitting channel during normal operations, and holding circuit means interconnecting said channels and operable to hold the output keying stage of the non-transmitting channel in mark condition upon receipt of a space signal in the transmitting channel during normal operation, said series circuits and holding means causing said output keying stage of a non-transmitting channel to become and remain non-conductive during a break-in space input to said non-transmitting channel in the midst of telegraph signal input to said transmitting channel.

8. A two-way, in-line, telegraph repeater means consisting entirely of parts which are motionless during operation thereof and which provides for normal and break-in operation, said repeater apparatus comprising a first signal transmission channel for transmission in a first direction and a second signal transmission channel for transmission in the opposite direction, each channel having an input circuit, a normally de-energized mark oscillator rendered operable in response to receipt of a mark signal at said input circuit and rendered inoperative in response to receipt of a space signal at said input circuit, a direct current limiting amplifier operable to cut-off in response to the operation of said mark oscillator, a cathode follower operable to provide a positive output in response to the cut-off condition of said amplifier, and an output keying stage rendered conductive in response to said output of said cathode follower to transmit a mark signal, said output keying stage being cut-off upon the receipt of a space signal at said input circuit during normal operation, the output keying stage of each channel being in series circuit with the input circuit of the other channel whereby the output keying stage of a non-transmitting channel is rendered conductive when a mark signal is received by the transmitting channel during normal operation, and holding circuit means interconnecting said channels and operable to hold the output keying stage of the non-transmitting channel in mark condition upon receipt of a space signal in the transmitting channel during normal operation, said holding circuit means comprising a space oscillator associated with each channel, means retaining said space oscillator in inoperative condition upon the receipt of a mark signal at the input circuit of its associated channel, means rendering said space oscillator operative upon the receipt of a space signal at its associated channel, and means for coupling the output of said space oscillator into the other channel, whereby the operation of said space oscillator will cause the output keying stage of the other channel to become conductive.

9. A two-way, in-line, telegraph repeater means consisting entirely of parts which are motionless during normal operation thereof and which provides for normal and break-in operation, said repeater apparatus comprising a first signal transmission channel for transmission in a first direction and a second signal transmission channel for transmission in the opposite direction, each channel having an input circuit, a normally de-energized mark oscillator rendered operable in response to receipt of a mark signal at said input circuit and rendered inoperative in response to receipt of a space signal at said input circuit, a direct current limiting amplifier operable to cut-off in response to the operation of said mark oscillator, a cathode follower operable to provide a positive and a negative output in response to the cut-off condition of said amplifier, an output keying stage rendered conductive in response to said positive output of said cathode follower to transmit a mark signal, said output keying stage being cut-off upon the receipt of a space signal at said output circuit during normal operation, the output keying stage of each channel being in series circuit with the input circuit of the other channel whereby the output keying stage of a non-transmitting channel is rendered conductive when a mark signal is received by the transmitting channel during normal operation, and holding circuit means interconnecting said channels and operable to hold the output keying stage of the non-transmitting channel in a conductive state upon receipt of a space signal in the transmitting channel during normal operation, said holding circuit means comprising a space oscillator associated with each channel, said cathode follower retaining said space oscillator in inoperative condition upon the receipt of a mark signal at the input circuit of its associated channel, said cathode follower rendering said space oscillator operative upon the receipt of a space signal at the input circuit of its associated channel, and means for coupling the output of said space oscillator into said limiting amplifier of said other channel, whereby the operation of said space oscillator will cause the output keying circuit of the other channel to become conductive.

References Cited in the file of this patent

UNITED STATES PATENTS

| | | |
|---|---|---|
| 1,428,156 | Espenschied | Sept. 5, 1922 |
| 1,665,698 | Gorton | Apr. 10, 1928 |
| 1,960,569 | Bellamy | May 29, 1934 |
| 2,096,841 | Branson et al. | Oct. 26, 1937 |
| 2,518,027 | Krecek | Aug. 8, 1950 |
| 2,757,237 | Goldman | July 31, 1956 |
| 2,762,863 | Wheeler et al. | Sept. 11, 1956 |